United States Patent
Susumu

(10) Patent No.: US 7,265,885 B2
(45) Date of Patent: Sep. 4, 2007

(54) MULTI-BEAM EMITTING DEVICE AND LIGHT SCANNING UNIT EMPLOYING THE SAME

(75) Inventor: Kikuchi Susumu, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/938,526

(22) Filed: Sep. 13, 2004

(65) Prior Publication Data

US 2005/0105155 A1 May 19, 2005

(30) Foreign Application Priority Data

Nov. 17, 2003 (JP) ............... 2003-386721

(51) Int. Cl.
*G02B 26/08* (2006.01)
(52) U.S. Cl. .................................. 359/204
(58) Field of Classification Search ........... 359/204, 359/233, 238, 243–244; 369/121; 372/50.12, 372/1–7, 24
See application file for complete search history.

(56) References Cited

U.S. PATENT DOCUMENTS

2001/0022768 A1* 9/2001 Takahashi ............ 369/120
2003/0123503 A1* 7/2003 Matsumoto et al. ........ 372/45
2003/0164503 A1* 9/2003 Chen .................... 257/79

FOREIGN PATENT DOCUMENTS

JP 2003-069152 3/2003

* cited by examiner

*Primary Examiner*—Euncha P. Cherry
(74) *Attorney, Agent, or Firm*—Roylance, Abrams, Berdo & Goodman, LLP

(57) ABSTRACT

A multi-beam emitting device which emits a multi-beam having a substantially equal wavelength and including a substrate and a plurality of laser beam emitting portions formed on the substrate, each of the laser beam emitting portions having an N type electrode layer, a P type electrode layer, and an active layer interposed between the N type and P type electrode layers. Each of the active layers is arranged such that a plane in which each active layer extends is substantially parallel to an upper surface of the substrate, and wherein the active layers are separated by a predetermined distance from each other in a direction following the upper surface of the substrate and simultaneously separated by a predetermined distance in a direction normal to the upper surface of the substrate. A light scanning unit is provided including the emitting device, a light deflection unit deflecting light beams emitted from the laser emitting device, and a scanning optical system scanning each of the light beams deflected by the light deflection unit in a sub-scanning direction to be separated by a predetermined pitch and parallel to each other.

12 Claims, 4 Drawing Sheets

MULTI-BEAM EMITTING DEVICE AND LIGHT SCANNING UNIT EMPLOYING THE SAME

CROSS-REFERENCE TO RELATED APPLICATIONS

This application claims the benefit under 35 U.S.C. §119(a) of Japanese Patent Application No. 2003-386721, filed in the Japanese Intellectual Property Office on Nov. 17, 2003, the entire contents of which are incorporated herein by reference.

BACKGROUND OF THE INVENTION

1. Field of the Invention

The present invention relates to a multi-beam emitting device and a light scanning unit employing the same. More particularly, the present invention relates to a multi-beam emitting device which can decrease an interval between scanning lines and reduce crosstalk without approximating light emitting points, and a light scanning unit employing the same.

2. Description of the Related Art

A laser diode device (hereinafter, referred to as an LD device) can have a semiconductor structure in which, a plurality of light emitting portions provided on the same substrate radiate a multi-beam. A multi-beam scanning unit, which can simultaneously expose a plurality of scanning lines using the LD device, has found many practical uses.

Since the multi-beam scanning unit having a multi-beam light emitting device exposes a plurality of scanning lines at the same time, a driving speed of a light deflection unit, for example, the rotation speed of a polygon mirror, is reduced while maintaining the same or higher performance compared to a light scanning unit using a single beam. Thus, a high speed output is possible at a high resolution so as to guarantee low noise and high reliability. Accordingly, the multi-beam scanning unit is typically applied to image forming systems such as laser printers, copying machines, and facsimiles.

Japanese Patent Publication No. 2003-69152, the entire contents of which are incorporated herein by reference, discloses an example of the multi-beam light emitting device. According to the example disclosed in the Publication No. 2003-69152, an active region is provided on or above a sapphire substrate extending to a predetermined height and parallel to the sapphire substrate. Four active regions are arranged with a minimum pitch of 16 μm.

The conventional multi-beam emitting device and multi-beam light scanning unit however, typically have the following problems.

When the multi-beam emitting device is used for the image forming system, for example, when an image is output at a general pixel density (resolution) of 600 dpi, a distance D between scanning lines needs to be set to 42.33 μm. In this case, since the typically adopted magnifying power of a scanning optical system is 4-10 times, a sub-scanning light emitting point pitch d is required that is less than 10 μm.

Since the interval between the light emitting points is at least 16 μm in the example disclosed in the Japanese Patent Publication No. 2003-69152, the interval between the light emitting points needs to be decreased as described below to meet the above demand.

FIGS. 1 through 3 illustrate the arrangement of the conventional multi-beam emitting device. Referring to FIG. 1, an LD device 10 includes a substrate 11 and laser emitting portions 12 and 13 arranged on the substrate 11, such that a pitch interval of light emitting points is $L_1$. Provided d equals a sub-scanning light emitting point pitch corresponding to a scanning line pitch, which corresponds to a resolution at a scanning surface, then a relationship in which d is less than $L_1$ is satisfied. Thus, by inclining the substrate 11 by an angle $\theta_1$ with respect to a main scanning direction Dm, an exterior beam pitch is adjusted to match the sub-scanning light emitting point pitch d. The angle $\theta_1$ is obtained from an equation (1) in which, $$d = L_1 \times \tan\theta_1 \tag{1}$$

Accordingly, even when $L_1$ is greater than d, $L_1$ is the interval between the scanning lines corresponding to a resolution at the scanning surface.

The flux of light radiated from the laser emitting portions 12 and 13 is diffracted by active layers 12a and 13a such that the flux of light becomes an approximately oval beam having a major axis in a direction perpendicular to the active layers 12a and 13a. Accordingly, when the angle $\theta_1$ is small, a beam whose flux of light has a large diameter, is emitted from the LD device 10 in the sub-scanning direction.

In the light scanning optical system, a loss of light increases since the shape of a flux of input light needs to be corrected, typically by using an oval or rectangular aperture extending in the main scanning direction, to correctly arrange the position of the beam profile in the main and sub-scanning directions and the diameter of a spot.

The beam emitted from the LD device 10 is linearly polarized in a direction in which the active layers 12a and 13a extend. Thus, the beam emitted from the LD device 10 is incident as a P-polarized light on a light deflection unit, such as a polygon mirror. Since the P-polarized light is significantly dependent upon the angle of a reflection rate, problems can occur wherein a reflection spot occurrence, due to the scanning angle, increases. Thus, to compensate for the problem, a costly reflection film coating is needed.

As shown in FIG. 2, when an angle $\theta_2$, formed between the main scanning direction Dm and a plane surface of the substrate 11, is compared with the angle $\theta_1$ of FIG. 1, the loss of light is reduced as the LD device 10 is inclined to establish an inequity wherein $\theta_2$ is greater than $\theta_1$, but wherein the light emitting point pitch $L_2$ on the substrate 11 approximately equals the sub-scanning light emitting point pitch d. In this case, as the two light emitting points approximately equal each other, thermal and electric crosstalk is generated such that light emission becomes unstable. In particular, in a state in which a first light emitting point emits light, when another light emitting point then starts to emit light, the light emitting output of the first light emitting point decreases.

As shown in FIG. 3, by setting the sub-scanning light emitting point pitch d at a value twice the scanning line interval D, that is, as shown in equation (2), $$d = 2 \times D \tag{2}$$

a beam spot 17 is interlace-scanned onto a photoreceptive drum 15. However, in this case, data process is complicated and thus an expensive image processing circuit is needed.

Accordingly, a need exists for a system and method to decrease an interval between scanning lines on a scanning surface while further reducing cross-talk between components.

SUMMARY OF THE INVENTION

To solve the above and/or other problems, the present invention provides a multi-beam emitting device and a light scanning unit employing the same, which decreases an interval between scanning lines on a scanning surface and simultaneously reduces cross-talk without approximating a plurality of light emitting points, such that high resolution and high quality light scanning is possible.

According to an object of the present invention, a multi-beam emitting device emits a multi-beam having a substantially equal wavelength, and including a substrate and a plurality of laser beam emitting portions formed on the substrate. Each of the laser beam emitting portions includes an N type electrode layer, a P type electrode layer, and an active layer interposed between the N type and P type electrode layers. Each of the active layers is arranged such that a plane in which each active layer extends is substantially parallel to an upper surface of the substrate. The active layers are separated by a predetermined distance from each other in a direction following the upper surface of the substrate, and are simultaneously separated by a predetermined distance in a direction normal to the upper surface of the substrate.

According to another object of the present invention, a light scanning unit comprises a multi-beam emitting device including a substrate and a plurality of laser beam emitting portions which are formed on the substrate, each of the laser beam emitting portions having an N type electrode layer, a P type electrode layer, and an active layer interposed between the N type and P type electrode layers. The light scanning unit further includes a light deflection unit for deflecting light beams emitted from the laser emitting portions, and a scanning optical system for scanning each of the light beams, deflected by the light deflection unit in a sub-scanning direction and which are separated by a predetermined pitch and parallel to each other. Each of the active layers is arranged such that a plane in which each active layer extends is substantially parallel to an upper surface of the substrate, and wherein the active layers are separated by a predetermined distance from each other in a direction following the upper surface of the substrate and are simultaneously separated by a predetermined distance in a direction normal to the upper surface of the substrate.

BRIEF DESCRIPTION OF THE DRAWINGS

The above and other objects, features and advantages of the present invention will become more apparent by describing in detail exemplary embodiments thereof with reference to the attached drawings in which.

In the drawings, it will be understood that like reference numerals refer to like features and structures.

DETAILED DESCRIPTION OF THE EXEMPLARY EMBODIMENTS

Figure 4:
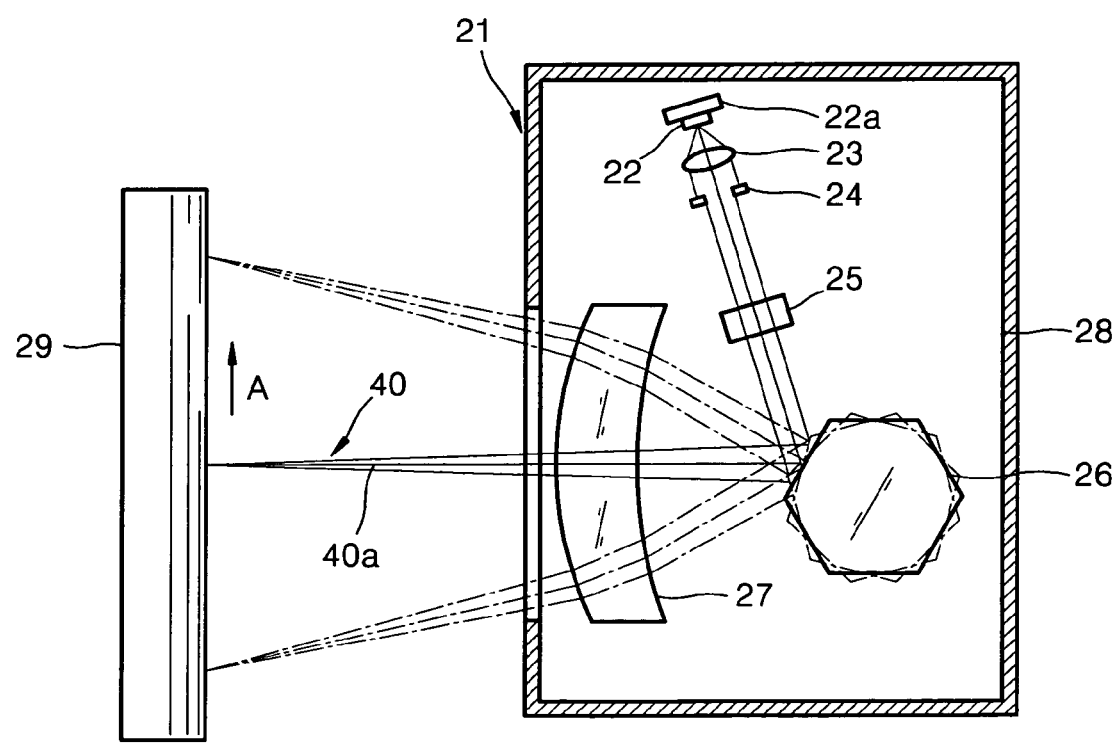
FIG. 4 is a partial cross-sectional view illustrating a light scanning unit according to an embodiment of the present invention.
Figure 5:
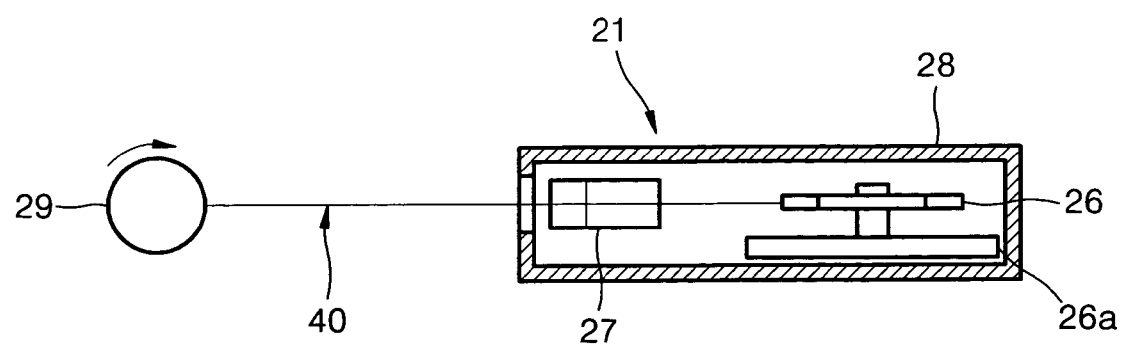
FIG. 5 is a partial cross-sectional view of the light scanning unit of FIG. 4.
Figure 6:
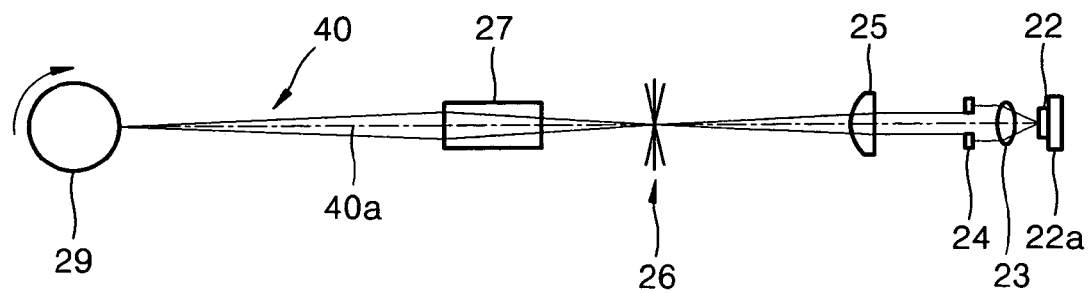
FIG. 6 is a view illustrating the optical arrangement of the light scanning unit of FIG. 4 in a sub-scanning direction.

Referring to FIGS. 4, 5, and 6, in a light scanning unit 21 according to an exemplary embodiment of the present invention, the unit scans a laser light flux 40 in one direction on a photoreceptor, and the surface of the photoreceptor is raster scanned to form a latent image. The laser light flux 40 is modulated and controlled according to an image signal, and concentrated on the surface of the photoreceptor as a spot having a predetermined diameter. In the example shown, a photoreceptive drum 29, rotating in one direction, can be used as the photoreceptor.

The light scanning unit 21 can be provided as a latent image forming unit of image forming systems, such as laser printers, copying machines, and laser facsimiles, and forms a high speed and high quality image. The light scanning unit 21 includes a case 28, a multi-beam emitting device 22 provided inside the case 28, a collimating device to condense a divergent beam emitted from the multi-beam emitting device 22, a beam shaping member to shape a beam passing through the collimating device, a condensing device to condense the shaped beam, and a beam deflection unit and a scanning optical system to deflect and scan an incident light. In the exemplary embodiment, a collimating lens 23, an aperture 24, a cylindrical lens 25, a polygon mirror 26, and an f-θ lens 27 are provided as examples of the collimating device, the beam shaping member, the condensing lens, and the beam deflection unit and the scanning optical system, respectively.

Figure 7:
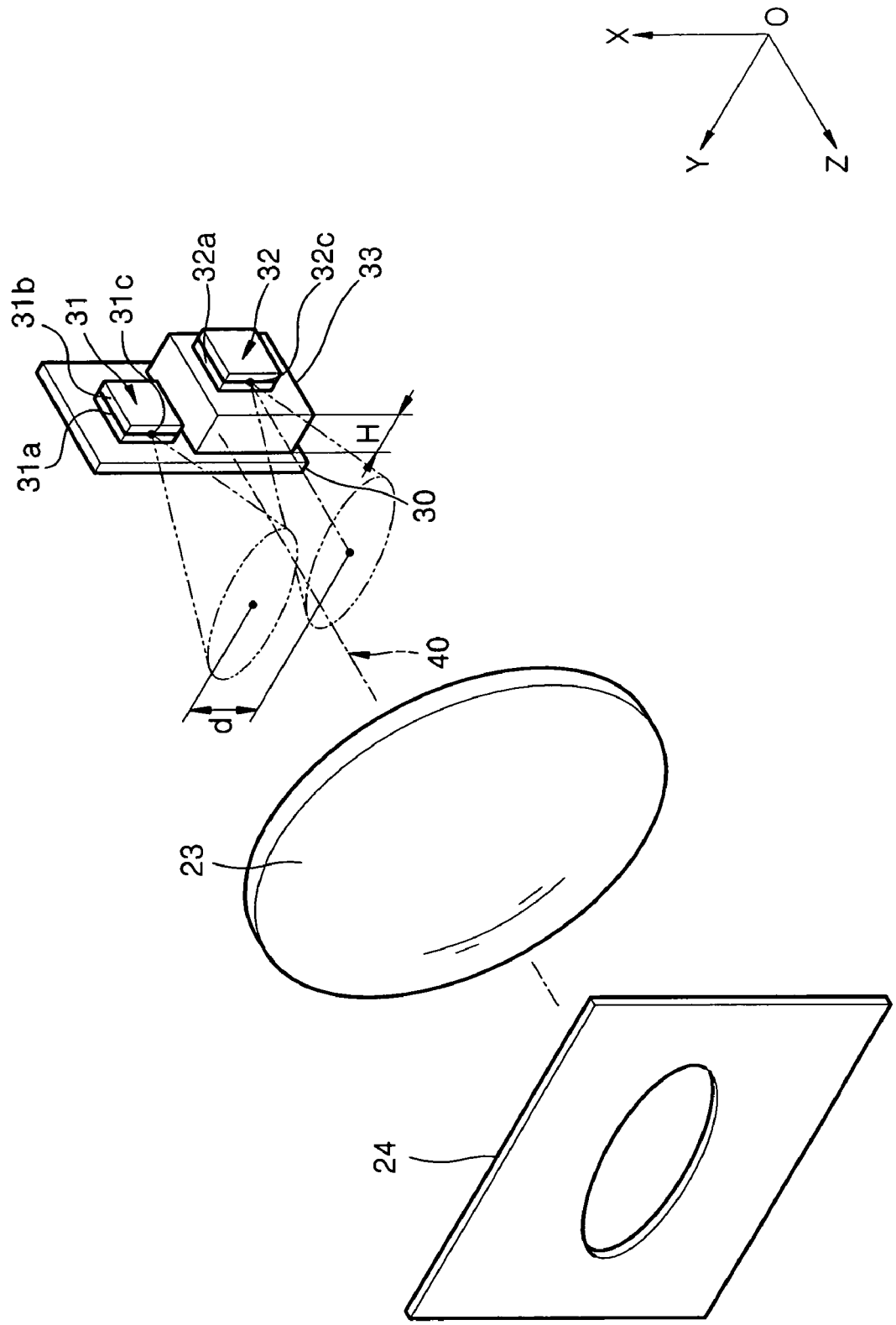
FIG. 7 is a perspective view illustrating a multi-beam emitting device according to an embodiment of the present invention.

Referring to FIG. 7, the multi-beam emitting device 22 includes a substrate 30, first and second laser emitting portions 31 and 32, and a mount 33. In FIG. 7, an X axis indicates a sub-scanning direction, a Y axis indicates a main scanning direction, and a Z axis indicates an optical axis direction. The substrate 30 can be a support member and can be comprised of a member capable of growing a semiconductor material layer of the first laser emitting portion 31. The substrate 30 can also be used as a negative electrode for the first and second laser emitting portions 31 and 32. In this case, a metal electrode can be formed on a surface of the substrate 30, that is, a surface opposite to a surface where the first and second laser emitting portions 31 and 32 are arranged.

The mount 33 reduces thermal and electrical influences between the first and second laser emitting portions 31 and 32 and reduces cross-talk. The mount 33 protrudes from the substrate 30 perpendicularly to a height H. The height H can be set appropriately according to a degree of thermal and electrical interaction, and can be formed higher than the height of each of the first and second laser emitting portions 31 and 32. The mount 33 can be formed integrally with the substrate 30 using the same material as that used for the substrate 30, or can be fixed to the substrate 30 using a material different from the substrate 30.

When the mount 33 is formed of a material different from the substrate 30, the mount 33 is preferably formed of a material and shape for exhibiting a superior thermal characteristic. For example, the mount 33 can be formed of a material and having a shape exhibiting a higher thermal conductivity and a higher heat radiating feature, a material and shape exhibiting a large heat capacity and easily maintained heat balance, a material and shape exhibiting a lower thermal conductivity and a higher insulation feature, or a combination thereof. In embodiments of the present invention, a predetermined metal, semiconductor, and/or ceramics can be used as the material of the mount 33.

Each of the first and second laser emitting portions 31 and 32 can be a semiconductor laser (hereinafter, referred to as the LD device) which generates and emits a laser flux of a predetermined wavelength λ. The first and second laser emitting portions 31 and 32 can be installed on the substrate 30 and the mount 33, respectively.

The wavelength λ of light flux emitted from the LD device has an appropriate value as required by the application. For example, an infrared ray laser having a wavelength of about 780 nm can be used for an image forming system such as a laser printer. In yet other applications, wavelengths other than the 780 nm wavelength value can be used. To form a high contrast image having a high resolution, the wavelength λ preferably has a value in a range of between approximately 600 to approximately 700 nm as derived from the relationship between focusing performance and sensitivity features of the photoreceptor drum 29.

The first laser emitting portion 31 includes an N type electrode layer 31a, an active layer 31c, and a P type electrode layer 31b, which are sequentially formed on the substrate 30. The first laser emitting portion 31 can be formed of various types of LD devices according to an oscillating wavelength and the maximum output of each type. For example, a Fabry-Perot type LD device having a dual hetero structure can be configured for use as described in greater detail below. In the example configuration, the up and down directions of the LD device correspond to negative and positive directions along the Y axis, respectively.

The substrate 30 can be formed of an N type GaAs crystal, and a negative electrode can be formed on a lower surface thereof. The N type electrode layer 31a can be a lower clad layer formed of an N type AlGaAs on the substrate 30. The active layer 31c can be a P type or N type GaAs layer formed on the N type electrode layer 31a to a thickness of about 0.1 μm to about 0.2 μm.

A plane in which the active layer 31c extends can be approximately parallel to an upper surface of the substrate 30. The P type electrode layer 31b can be formed by epitaxially growing each of an upper clad layer formed of P type AlGaAs, and a contact layer formed of P type GaAs, which are sequentially formed on the active layer 31c, and forming a strip to create a light emitting portion of the active layer 31c thereon and a positive electrode using a predetermined metal.

A cleavage facet can be formed at a side surface of the first laser emitting portion 31. A photodiode (not shown) for monitoring and detecting a beam emitted to the rear of the first laser emitting portion 31 can be further provided near the first laser emitting portion 31. The monitoring photodiode can be used to control the amount of light emitted from the first laser emitting portion 31. The LD device having the above structure can be easily formed by a semiconductor manufacturing process which is well known to those skilled in the art. The mount 33 can be formed simultaneously with the substrate 30.

The second laser emitting portion 32 has substantially the same structure as that of the first laser emitting portion 31, except for being installed on the mount 33. That is, the second laser emitting portion 32 includes an N type electrode layer 32a, an active layer 32c, and a P type electrode layer 32b corresponding to the N type electrode layer 31a, the active layer 31c, and the P type electrode layer 31b of the above described first laser emitting portion 31, respectively. The active layer 32c is fixed on the mount 33 to be approximately parallel to the upper surface of the substrate 30.

When the mount 33 is formed of a material different from that of the substrate 30, the mount 33 can be formed of the N type GaAs crystal which forms a negative electrode on the N type electrode layer 32a. The first and second laser emitting portions 31 and 32 configured as described above, can be installed integrally with the substrate 30 and the mount 33. The independent LD devices can also be fixed on the substrate 30 and the mount 33, respectively.

The interval between the light emitting points of the active layers 31c and 32c in the X axis can be set to a sub-scanning light emitting point pitch value d. The light emitting point is defined as a position of the center of light output intensity on the cleavage facet at an exit side. The sub-scanning light emitting point pitch d is a distance determined from the magnifying power of the optical system in the sub-scanning direction, which is a value determining a desired scanning pitch (i.e., an interval between scanning lines in the sub-scanning direction) on a scanning surface.

For example, in the case of a pixel density (i.e., resolution) of 600 dpi, when the scanning pitch D is set to be 42.33 μm, the sub-scanning light emitting portion pitch d satisfies an equation (3) below, $$d=D/\beta_S \quad (3)$$

provided that the magnifying power of the optical system in the sub-scanning direction is $\beta_S$. For example, when $\beta_S=4$, then d=10.5 μm.

Returning to FIG. 4, an LD driving unit 22a which modulates and drives the emitted light flux corresponding to an image signal, can be electrically connected to the positive and negative electrodes of the first and second laser emitting portions 31 and 32 which constitute the multi-beam emitting device 22.

The collimating lens 23 can be an optical element having a positive power with an optical axis 40a on an axis which equally divides, in a vertical direction, a segment of a line connecting the light emitting points of the active layers 31c and 32c. By appropriately adjusting the position of the collimating lens 23 in the optical axis direction, the respective light fluxes emitted from the first and second laser emitting portions 31 and 32 can be made to provide almost parallel light fluxes. To achieve this, the collimating lens 23 can be at least one element selected from a lens group made up of a spherical or aspherical lens, or a combination thereof, a Fresnel lens, and a holographic optical element.

The aperture 24 is arranged above the collimating lens 23 and can be provided as an opening iris having an almost oval shaped opening. The aperture 24 shapes the parallel light flux passing through the collimating lens 23 into an oval shaped beam having the major axis in the Y axis direction. The shape of the aperture 24 varies such that the size of a spot and a beam profile in the main scanning direction, and in the sub-scanning direction on the scanning surface, each have appropriate sizes and shapes according to the pixel density.

In the exemplary embodiment, the aperture 24 can have an almost oval shape having the major axis in the Y axis direction (i.e., the main scanning direction), but the present invention is not limited thereto. For example, if the aperture 24 is opened to extend the major axis in the Y axis direction, an oval or ball shape aperture having a longer major axis is available.

The cylindrical lens 25, as shown in FIGS. 4 and 6, condenses the proceeding light flux after passing through the aperture 24 in the sub-scanning direction, and forms an image at a focal point position.

The polygon mirror 26, as shown in FIGS. 4 and 5, can include a regular polygonal mirror surface such as a hexagon mirror surface, and can be rotated by a motor 26a at a rotation speed according to the pixel density. The polygon mirror 26 can be arranged to deflect the light flux passing through the cylindrical lens 25 in the main scanning direction toward the image forming position in the sub-scanning direction. Thus, as the deflection surface and the scanning surface become a conjugate in the sub-scanning direction, an optical face angle error correction can be performed.

The f-θ lens 27 can be a lens or a lens group, which forms an image from the light flux deflected by the polygon mirror 26 onto the scanning surface at a constant speed in the main scanning direction. The light scanning unit 21 includes a sync detection sensor which controls the brightness of an image, a driving control unit which drives the multi-beam emitting device 22, and a motor driving unit which drives the motor 26a. However, since these elements are well known to those skilled in the art, detailed descriptions thereof will be omitted.

The operations of the light scanning unit and the multi-beam emitting device according to the exemplary embodiment of the present invention are described in greater detail below.

Referring to FIG. 7, when power is applied to the first and second laser emitting portions 31 and 32, laser beams are emitted from the active layers 31c and 32c in the Z axis direction. The emitted light flux is a divergent light spreading in an approximately oval shape and having a major axis in the Y axis direction by diffraction, since a thickness of each of the active layers 31c and 32c is thin in the Y axis direction. The light flux is polarized in the X axis direction (i.e., in the sub-scanning direction) in which the active layers 31c and 32c extend.

Since the first and second laser emitting portions 31 and 32 intermittently emit light according to the image signal, the heat value or driving current thereof are different for each. As a result, a possibility can exist for generating an essentially thermal and electrical cross-talk. However, in the exemplary embodiment, since the first and second laser emitting portions 31 and 32 are separated from each other by the mount 33, cross-talk can be substantially reduced.

For example, when the material and shape of the mount 33 have a high heat radiation feature to increase a heat conductivity, an undesired change in the temperature of the first and second laser emitting portions 31 and 32 can be reduced by a heat radiation action. Also, when the material and shape of the mount 33 have a large heat capacity and easily maintain a heat balance, the undesired change in temperature can be reduced even when the heat value is irregular. Further, when the material and shape of the mount 33 have a low heat conductivity and a high insulation effect, heat radiation effects by the first and second laser emitting portions 31 and 32 can be blocked from one another. The material and shape of the mount 33 therefore, can be selected according to use conditions and a driving environment of the light scanning unit 21.

When each of the divergent light beams emitted from the first and second laser emitting portions 31 and 32 arrives at the collimating lens 23, the divergent light is refracted by the collimating lens 23 while enlarging the diameter of the light flux, and then proceeds toward a position where an image is formed as an approximately oval parallel light flux having a major axis in the Y axis direction. The major axis is several millimeters or more, although the axis length depends on a wavelength or focal distance when the pixel density thereof is 600 dpi, for example.

Since the two light fluxes are separated by a distance Δ from the optical axis 40a, wherein the distance Δ is defined by the following equation (4), $$\left(\Delta = \frac{1}{2} \cdot \sqrt{(H^2 + d^2)}\right) \quad (4)$$

they each proceed along a path deviated from the optical axis 40a by the distance Δ. Since these light fluxes are substantially smaller than the focal distance of the collimating lens 23, a rate of a coupling efficiency decreases significantly compared to a case having no deviation from the optical axis.

Also, since the distance Δ is substantially smaller than the size of the aperture 24, the light fluxes can overlap each other to pass through the opening of the aperture 24. Thus, the spreading of the light flux approximately matches the opening of the aperture 24. Also, the loss of light by the aperture 24 can be lowered compared to a case in which the direction of the major axis of the light flux does not match the major axis of the aperture 24.

Returning to FIG. 4, the parallel light fluxes passing through the aperture 24 and having optical axes deviated from each other by the distance Δ, are then condensed by the cylindrical lens 25 in the sub-scanning direction and arrive at a reflection surface of the polygon mirror 26. The light fluxes are then deflected by the polygon mirror 26 in a direction A. Since an incident light flux is S polarized, dependency of a reflection rate on a deflection angle is less than that of a P polarized light. Also, a reflection film of the polygon mirror 26 can be easily coated and irregularity of the light amount can be reduced.

Figure 1:
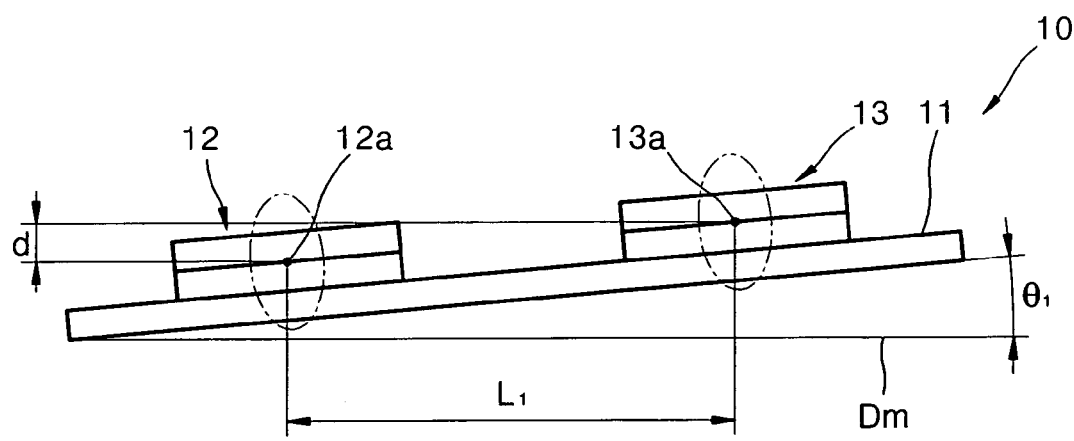
FIGS. 1 and 2 are front views illustrating the arrangement of a conventional multi-beam emitting device.
Figure 2:
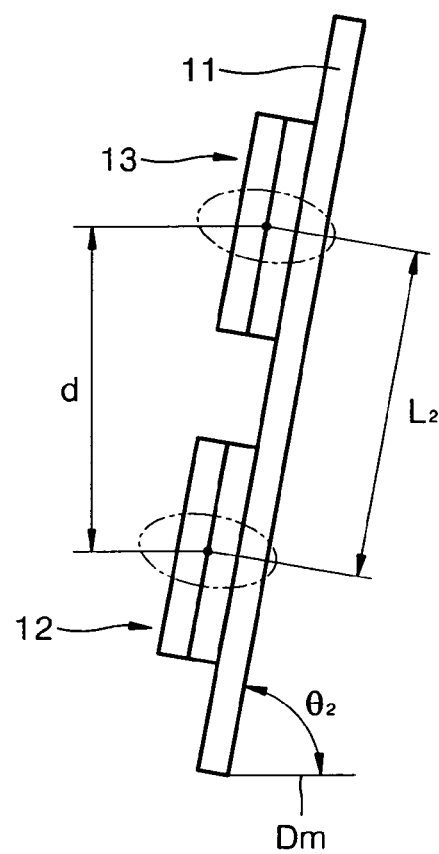
Figure 3:
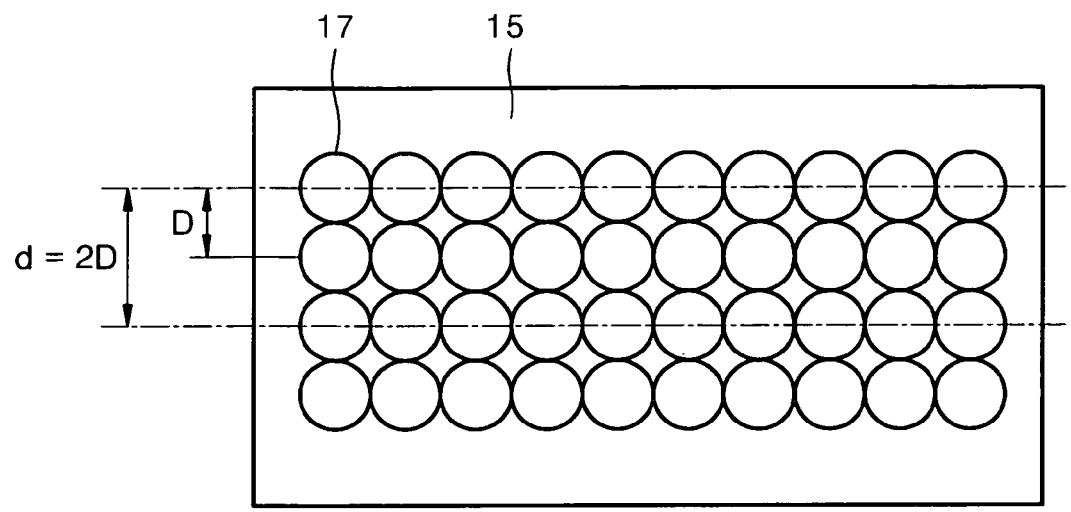
FIG. 3 is a view illustrating the interface scanning using the conventional multi-beam emitting device.

The deflected beam is then condensed in the respective main scanning and sub-scanning directions toward a surface of the photoreceptor drum 29 through an optical action of the f-θ lens 27, and forming a predetermined spot size. The respective scanning lines are scanned to be separated by the distance D (refer to FIG. 3) from each other in the sub-scanning direction.

By making the distance D a scanning pitch according to the pixel density, two adjacent scanning lines can be simultaneously formed without interlace scanning. Thus, since the number of rotations of the polygon mirror 26 can be reduced to about half compared to a case of scanning a single beam, noise due to the driving of the polygon mirror 26 can be reduced and the life span of the polygon mirror 26 can be extended. Also, in yet other embodiments wherein the number of the reflection surfaces of the polygon mirror 26 are reduced while the rotation speed is maintained, the manufacturing costs of the polygon mirror 26 can be reduced.

The light scanning unit 21 and the multi-beam emitting device 22 according to the exemplary embodiment of the present invention, provide light scanning corresponding to a high resolution without being affected by cross-talk. Also, the loss and irregularity of the light amount can be reduced. As a result, the light scanning unit 21 and the multi-beam emitting device 22 can be employed in a high quality image forming system.

Although the multi-beam emitting device 22, the LD driving unit 22a, the collimating lens 23, and the aperture 24 are installed within the case 28 in the above description, a light source unit can be formed by fixing part or all of the above elements to another support member to be attachable to or detachable from the case 28.

Also, although the first and second laser emitting portions 31 and 32 are described as an example of the multi-beam emitting device 22 in the exemplary embodiment, two or more laser emitting portions can be provided therefor.

As described above, the multi-beam emitting device according to the present invention includes a plurality of laser emitting portions, wherein a predetermined extending interval between the respective active layers can be decreased in a direction following the upper surface of the substrate, and simultaneously, an interval between the respective active layers can be increased in a direction normal to the upper surface of the substrate. Thus, since the extending interval between the respective active layers can be provided in the direction in which the active layers extend without decreasing the interval between the light emitting points, cross-talk can be significantly reduced.

Also, according to the light scanning unit of the present invention, by employing the multi-beam emitting device as a light source, the interval between scanning lines decreases and light scanning corresponding to a high resolution is performed. Also, cross-talk can be reduced and a high quality light scanning is possible.

While the present invention has been particularly shown and described with reference to exemplary embodiments thereof, it will be understood by those skilled in the art that various changes in form and details can be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A multi-beam emitting device, comprising:
   a substrate, having an upper surface;
   a plurality of laser beam emitting portions formed on the substrate for emitting a multi-beam having a substantially equal wavelength, each of the laser beam emitting portions comprising an N type electrode layer, a P type electrode layer, and an active layer interposed between the N type and P type electrode layers; and
   wherein each of the active layers is arranged such that a plane in which each active layer extends is substantially parallel to the upper surface of the substrate, and wherein each of the active layers is separated by a predetermined distance from each other in a direction following the upper surface of the substrate and further wherein each of the active layers is separated by a predetermined distance in a direction normal to the upper surface of the substrate.

2. The multi-beam emitting device as claimed in claim 1, wherein each of the laser emitting portions emits a light beam having a wavelength in a range of between approximately 600 nm and approximately 700 nm.

3. The multi-beam emitting device as claimed in claim 1, further comprising a mount having a predetermined height between at least one of the laser emitting portions and the substrate, wherein the predetermined height is selected to achieve a desired degree of thermal and electrical interaction between the plurality of laser beam emitting portions.

4. The multi-beam emitting device as claimed in claim 3, wherein each of the laser emitting portions emits a light beam having a wavelength in a range of between approximately 600 nm and approximately 700 nm.

5. The multi-beam emitting device as claimed in claim 3, wherein a height of the mount is higher than that of at least one of the laser emitting portions which is directly formed on the upper surface of the substrate.

6. The multi-beam emitting device as claimed in claim 5, wherein each of the laser emitting portions emits a light beam having a wavelength in a range of between approximately 600 nm and approximately 700 nm.

7. A light scanning unit comprising:
   a multi-beam emitting device including a substrate and a plurality of laser beam emitting portions which are formed on the substrate for emitting a multi-beam having a substantially equal wavelength, each of the laser beam emitting portions comprising an N type electrode layer, a P type electrode layer, and an active layer interposed between the N type and P type electrode layers;
   a light deflection unit for deflecting light beams emitted from the laser emitting portions;
   a scanning optical system for scanning each of the light beams deflected by the light deflection unit in a sub-scanning direction such that each of the light beams is separated by a predetermined pitch and is substantially parallel to each other; and
   wherein each of the active layers is arranged such that a plane in which each active layer extends is substantially parallel to an upper surface of the substrate, and wherein each of the active layers is separated by a predetermined distance from each other in a direction following the upper surface of the substrate, and further wherein each of the active layers is separated by a predetermined distance in a direction normal to the upper surface of the substrate.

8. The light scanning unit as claimed in claim 7, further comprising:
   a collimating lens for converting a divergent light beam emitted from the multi-beam emitting device into light fluxes substantially parallel to each other;
   a beam shaping member for changing a diameter of each parallel light flux to be smaller in the sub-scanning direction than in a main scanning direction; and
   a condensing device disposed on an optical path between the multi-beam emitting device and the light deflection unit for condensing the parallel light fluxes passing through the beam shaping member in the sub-scanning direction.

9. The light scanning unit as claimed in claim 7, wherein each of the laser emitting portions emits a light beam having a wavelength in a range of between approximately 600 nm and approximately 700 nm.

10. The light scanning unit as claimed in claim 7, wherein the directions in which the active layers of the multi-beam emitting device extend are substantially perpendicular to the main scanning direction.

11. The light scanning unit as claimed in claim 10, further comprising:
   a collimating lens for converting a divergent light beam emitted from the multi-beam emitting device into light fluxes substantially parallel to each other;

a beam shaping member for changing a diameter of each parallel light flux to be smaller in the sub-scanning direction than in a main scanning direction; and a condensing device disposed on an optical path between the multi-beam emitting device and the light deflection unit for condensing the parallel light fluxes passing through the beam shaping member in the sub-scanning direction.

12. The light scanning unit as claimed in claim 10, wherein each of the laser emitting portions emits a light beam having a wavelength in a range of between approximately 600 nm and approximately 700 nm.

* * * * *